(12) United States Patent
Kim

(10) Patent No.: US 7,746,523 B2
(45) Date of Patent: Jun. 29, 2010

(54) APPARATUS AND METHOD OF FORMING AN IMAGE

(75) Inventor: Yun-su Kim, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1504 days.

(21) Appl. No.: 11/080,392

(22) Filed: Mar. 16, 2005

(65) Prior Publication Data

US 2005/0206970 A1    Sep. 22, 2005

(30) Foreign Application Priority Data

Mar. 16, 2004    (KR) ...................... 10-2004-0017663

(51) Int. Cl.
*H04N 1/04* (2006.01)
(52) U.S. Cl. ...................... 358/498; 358/497; 358/474; 358/486; 271/265.01; 271/258.01; 271/220; 399/396
(58) Field of Classification Search ................ 358/498, 358/497, 496, 486, 488, 474, 448; 271/258.01, 271/220.66, 265.01, 270, 266, 228; 399/396
See application file for complete search history.

(56) References Cited

U.S. PATENT DOCUMENTS

| | | | | |
|---|---|---|---|---|
| 5,461,468 A * | 10/1995 | Dempsey et al. | ............ | 399/396 |
| 5,687,010 A * | 11/1997 | Van Tilborg et al. | ........ | 358/496 |
| 5,708,512 A * | 1/1998 | Ishizuka | .................... | 358/449 |
| 6,234,470 B1 * | 5/2001 | Okitsu et al. | ................. | 271/114 |
| 6,335,807 B1 * | 1/2002 | Neale et al. | ................. | 358/486 |
| 6,614,564 B1 * | 9/2003 | Sakaguchi | ................... | 358/487 |
| 6,954,292 B2 * | 10/2005 | Inoue | ......................... | 358/475 |
| 6,967,752 B1 * | 11/2005 | Katakura | .................... | 358/518 |
| 7,342,686 B2 * | 3/2008 | Barry et al. | .................. | 358/1.9 |
| 7,448,622 B2 * | 11/2008 | Kim | ...................... | 271/265.01 |
| 7,463,370 B2 * | 12/2008 | Yada et al. | ................... | 358/1.1 |
| 2002/0030756 A1 * | 3/2002 | Inoue | ......................... | 348/345 |
| 2004/0212852 A1 * | 10/2004 | Lee | ............... | 358/488 |
| 2008/0259415 A1 * | 10/2008 | Ishido | ........................ | 358/498 |
| 2009/0201560 A1 * | 8/2009 | Hashimoto | .................. | 358/474 |

FOREIGN PATENT DOCUMENTS

| | | |
|---|---|---|
| JP | 63-112326 | 5/1988 |
| JP | 2000-143036 | 5/2000 |
| KR | 94-12067 | 6/1994 |
| KR | 95000412 | 1/1995 |
| KR | 2001-0047490 | 6/2001 |

\* cited by examiner

*Primary Examiner*—Negussie Worku
(74) *Attorney, Agent, or Firm*—Staas & Halsey LLP

(57) ABSTRACT

In a method and an apparatus for forming image, digital image information is generated by conveying a document and scanning an image recorded on the document while conveying the document. When an image is scanned with a high resolution that is greater than a default resolution, a document is conveyed at a default speed at an initial stage and the document is conveyed at a speed slower than the default speed during an image scanning operation. The image forming apparatus includes a scan unit scanning the image recorded on the document, and a conveying unit which conveys the document at a default speed in an initial stage of conveying the document, and which conveys the document at a speed slower than the default speed while scanning the image in a high resolution scanning operation that has higher resolution than a default resolution.

20 Claims, 6 Drawing Sheets

APPARATUS AND METHOD OF FORMING AN IMAGE

CROSS-REFERENCE TO RELATED APPLICATION

This application claims the benefit of Korean Patent Application No. 2004-17633, filed on Mar. 16, 2004, in the Korean Intellectual Property Office, the disclosure of which is incorporated herein in its entirety by reference.

BACKGROUND OF THE INVENTION

1. Field of the Invention

The present invention relates to an apparatus and a method of forming an image, and more particularly, to an apparatus and a method of forming an image, by which less time is taken from picking a document to discharging the document in a high resolution scanning operation.

2. Description of the Related Art

In general, an image forming apparatus is an apparatus that receives an image signal and transfers the image signal onto a document as a visual image. On the other hand, an image forming apparatus having an image scanning function is an image forming apparatus having a function of reading an image recorded on a document and converting the image into digital image information so as to be displayed on another document or a display device, for example, a facsimile or a scanner. The image forming apparatus having the scanning function includes a conveying unit that transports a document, on which an image is recorded, into the image forming apparatus along a predetermined document conveying path and discharges the document out of the image forming apparatus, and a scanning unit disposed on the document conveying path. The conveying unit generally includes various kinds of rollers, and a driving unit such as a motor or a clutch for driving the rollers. The scanning unit includes a charge coupled device (CCD) module. When the document passes the CCD module, the image recorded on the document is read out.

However, in order to obtain high resolution digital image information of high resolution from the image scanning operation, the conveying speed of a document passing the CCD module should be slower than that for a document having relatively lower resolution. Therefore, in the conventional image forming apparatus, in a case where the resolution of the scanning document is high, the speed of conveying the document is lowered throughout the entire conveying path, that is, from picking the document to discharging the document. Accordingly, it takes a lot of time from the picking operation to the discharging operation in the high resolution scanning operation, and consequently, scanning efficiency of the image forming apparatus is degraded. Also, a rotating speed of a pickup roller that picks up the document is too slow to perform the pickup operation well.

SUMMARY OF THE INVENTION

Additional aspects and/or advantages of the invention will be set forth in part in the description which follows and, in part, will be obvious from the description, or may be learned by practice of the invention.

The present invention provides an apparatus and a method of forming image that can improve a scanning efficiency in a high resolution scanning operation.

The present invention also provides an apparatus and a method of forming an image, by which errors generated in picking up documents can be reduced when a high resolution scanning operation is performed.

According to an aspect of the present invention, there is provided an image forming method, by which digital image information is generated by conveying a document and scanning an image recorded on the document during conveying of the document, the method including: conveying a document at a default speed at an initial stage of a conveying operation, and conveying the document slower than the default speed while performing an image scanning operation in a high resolution scanning operation that has a higher resolution than a default resolution.

The document may be conveyed while passing through a pickup section, where the document is picked and started to be conveyed, a scanning and conveying section, where an image on a surface of the document is scanned during conveying the document, and a discharging section, where the scanned document is discharged and conveying of the document is terminated, and the document may be conveyed slower than the default speed on a scan and conveying section.

The document may be conveyed while passing through an arranging and conveying section, on which the picked document is arranged before being scanned, and the document may be conveyed slower than the default speed while passing through the arranging and conveying section.

The document may be conveyed while passing through a post-scan conveying section, on which the scanned document is conveyed, and the document may be conveyed at a speed slower than the default speed while being conveyed on the post-scan conveying section.

The document may pass through a returning section, on which the document is returned in order to scan an image recorded on the other surface of the document, may be conveyed again on the scanning and conveying section in order that the image recorded on the other surface of the document can be scanned, and conveyed at a speed slower than the default speed during passing through the scanning and conveying section again.

The document may be conveyed on an arranging and returning section, on which the returned document is arranged before being scanned, and the document may be conveyed at a speed slower than the default speed while passing through the arranging and returning section.

According to another aspect of the present invention, there is provided an image forming apparatus, which generates digital image information by conveying a document and scanning an image recorded on the document while conveying the document, the apparatus including: a scan unit scanning the image recorded on the document; and a conveying unit conveying the document at a default speed in an initial stage of conveying the document, and conveying the document at a speed slower than the default speed while scanning the image in a high resolution scanning operation that has a higher resolution than a default resolution.

The conveying unit may include a pickup unit starting the conveying process of the document by picking up the document, a pre-scan conveying unit conveying the document toward the scan unit so that an image on a surface of the document can be scanned, a discharging unit discharging the scanned document and terminating the conveying process, and a speed controller controlling the pickup unit at the initial stage of the conveying operation, so that the document can be conveyed at a default speed and controlling the pre-scan conveying unit during the image scanning operation so that the document can be conveyed at a speed slower than the default speed.

According to an aspect of the present invention, there is provided an image forming method, by which digital image information is generated by conveying a document and scanning an image recorded on the document while conveying the document, the method including: conveying a document at a first speed at an initial stage of a conveying operation, and conveying the document at a second speed while performing image scanning, wherein the second speed varies in accordance with a scanning resolution for an image document to be scanned.

The document may be conveyed with different speeds between at an initial stage of a conveying operation and while performing an image scanning when the scanning resolution is not a default resolution.

The conveying unit may include an arranging and conveying unit that arranges the picked document before scanning the document, and the speed controller, may include an element that controls the arranging and conveying unit so that the document passing through the arranging and conveying unit can be conveyed at a speed slower than the default speed.

The conveying unit may include a post-scan conveying unit that conveys the scanned document, and the speed controller may include an element that controls the post-scan conveying unit so that the document passing through the post-scan conveying unit can be conveyed at a speed slower than the default speed during the image scanning operation.

The conveying unit may include a returning unit that returns the document to the pre-scan conveying unit in order to scan an image recorded on another surface of the document, one surface of which is scanned previously, and the speed controller may include an element that controls the pre-scan conveying unit so that the document can be conveyed at a speed slower than the default speed while the image on the other surface of the document is scanned.

The conveying unit may include an arranging and returning unit that arranges the document before the returned document is scanned, and the speed controller may include an element that controls the arranging and returning unit so that the document passing through the arranging and returning unit can be conveyed at a speed slower than the default speed.

BRIEF DESCRIPTION OF THE DRAWINGS

These and/or other aspects and advantages of the invention will become apparent and more readily appreciated from the following description of the embodiments taken in conjunction with the accompanying drawings in which.

DETAILED DESCRIPTION OF THE PREFERRED EMBODIMENTS

Figure 1:
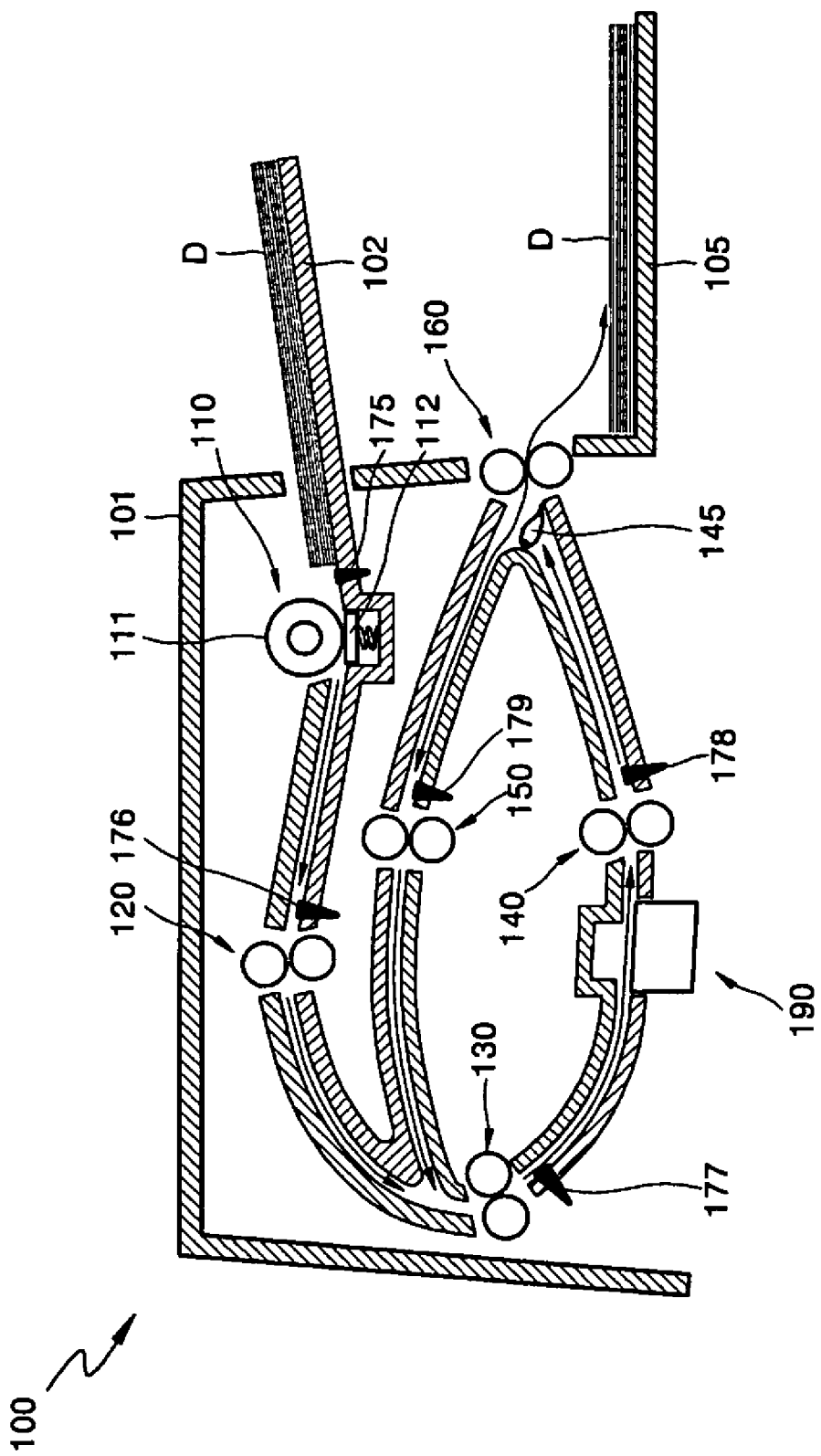
FIG. 1 is a schematic cross-sectional view illustrating an image forming apparatus according to an exemplary embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
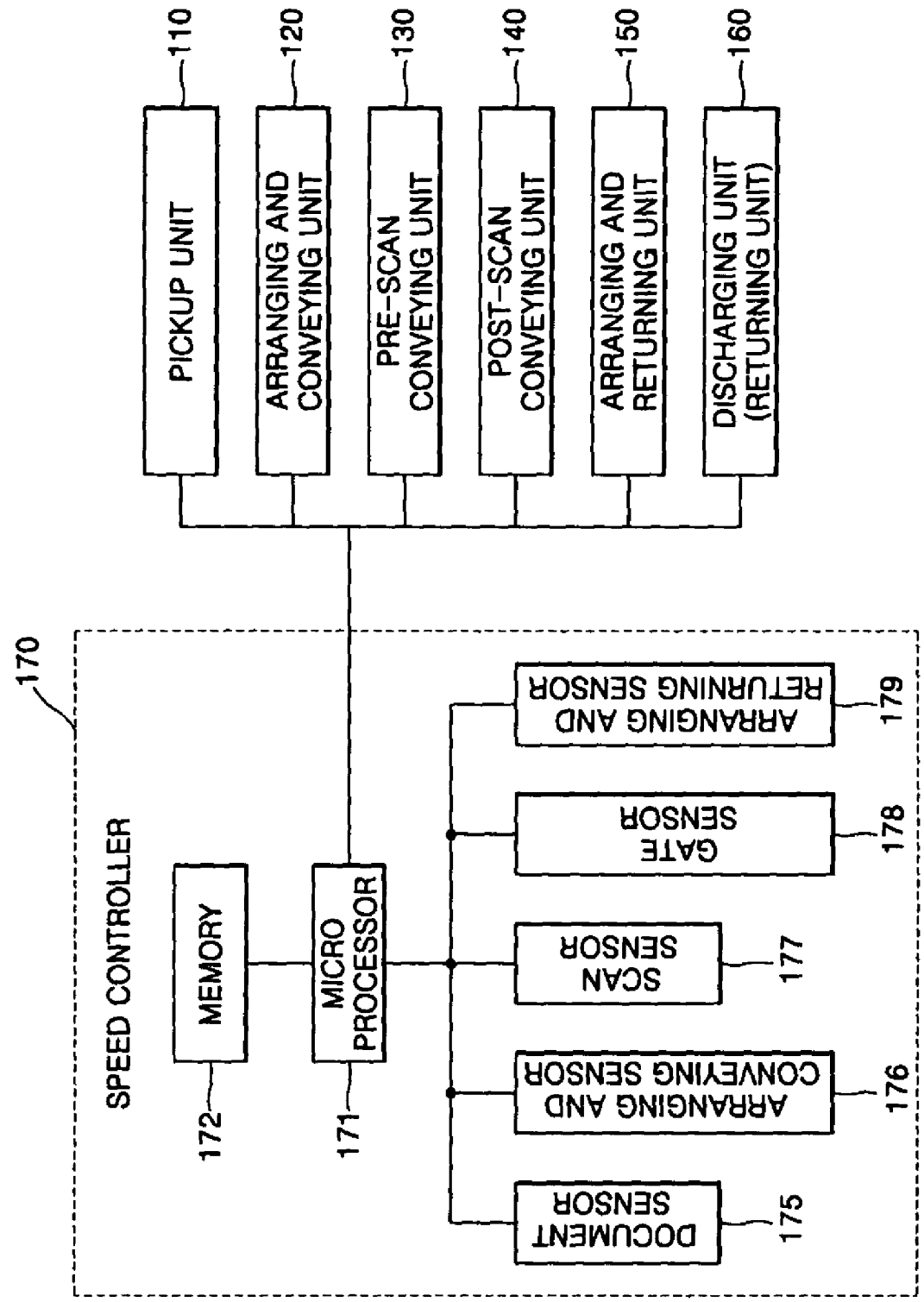
FIG. 2 is a block diagram showing a construction of a conveying unit included in the image forming apparatus of FIG. 1.

FIG. 1 is a schematic cross-sectional view showing an image forming apparatus according to an exemplary embodiment of the present invention, FIG. 2 is a block diagram showing a construction of a conveying unit included in the image forming apparatus of FIG. 1. In addition, FIGS. 3 and 4 are flow charts illustrating first and second examples of an image forming method according to the present invention using the image forming apparatus of FIG. 1.

Referring to FIGS. 1 and 2, the image forming apparatus 100 according to an embodiment of the present invention is an image forming apparatus having an image scanning function, and more particularly, an image forming apparatus that conveys mounted documents D one by one to scan images recorded on both surfaces of the document. The image forming apparatus 100 includes a housing 101, a conveying unit that conveys the document D, on which images are recorded, along a predetermined conveying path, and a scan unit 190 disposed on the conveying path of the document D to scan the images recorded on the documents.

The conveying unit has a duplex auto document feeding (DADF) function, that is, the conveying unit conveys the document D one by one so that the images recorded on both surfaces of the document D can be scanned. The conveying unit includes a paper supplying board 102 that is slanted so that a front edge of the mounted document D can slide into the housing 101, a pickup unit 110 successively located on the paper supplying board 102 so as to pick the documents D one by one, an arranging and conveying unit 120 that arranges and conveys the document D, a pre-scan conveying unit 130 that conveys the document D toward the scan unit 190, a post-scan conveying unit 140 that conveys the scanned document D, a discharging unit 160 that discharges the scanned document D out of the housing 101, and a discharging board 105, on which the document D discharged out of the housing 101 is stacked. Also, the conveying unit further includes a returning unit 160 that returns the document D, a surface of which is scanned, to the pre-scan conveying unit 130 for performing the DADF function, an arranging and returning unit 150 that arranges and conveys the returned document D before scanning the document D, and a shutter 145 that prevents the returning document D from proceeding to the post-scan conveying unit 140. In the exemplary embodiment of the present invention shown in FIGS. 1 and 2, the discharging unit 160 functions as the returning unit.

The pickup unit 110 includes a pickup roller 111 and a friction pad 112 that faces the pickup roller 11. In addition, the arranging and conveying unit 120, the pre-scan conveying unit 130, the post-scan conveying unit 140, the arranging and returning unit 150, and the discharging unit (returning unit) 160 respectively include a driving roller rotated by a driving force of the motor and an idle roller rotated by being subjected to the rotation of the driving roller. Although it is not shown in FIGS. 1 and 2, the driving rollers of the pickup roller 111, the arranging and conveying unit 120, the pre-scan conveying unit 130, the post-scan conveying unit 140, and the arranging and returning unit 150 are driven by a first motor, and the driving roller of the discharging unit, that is, the returning unit 160, is driven by a second motor. The driving force of the first motor can be transmitted to the driving roller that requires the driving force, through a clutch.

The scan unit 190 generally includes a charge-coupled device (CCD) module, and is disposed between the pre-scan conveying unit 130 and the post-scan conveying unit 140 to scan a lower surface of the conveying document D and generate digital image information.

On the other hand, the conveying unit of the image forming apparatus 100 includes a speed controller 170 that controls the velocity of document D that is conveyed in the housing 101. That is, the speed controller 170 controls rotating time, rotating speed, and rotating direction of the respective driving rollers that are rotated by the driving force of the motors by transmitting appropriate controlling signals to the first and second motors (not shown) and the clutch (not shown), thereby controlling the velocity of the document D. The speed controller 170 includes a document sensor 175 for sensing a present position of the conveying document D, an arranging and conveying sensor 176, a scan sensor 177, a gate sensor 178, an arranging and returning sensor 179, a micro processor 171 receiving position information from the sensors 175~179 and generating appropriate controlling signals, and a memory 172 storing codes for controlling. Although it is not shown in FIG. 2, the micro processor 171 of the speed controller 170 is electrically connected to a main controller of the image forming apparatus 100. Photo sensors are generally used as the sensors 175~179, and when the document D hits a lever that protrudes on the conveying path, thus the lever is slanted, the sensors 175~179 are turned on. When the documents D has passed and the lever returns to the original position, the sensors 175~179 are turned off.

Hereinafter, an image forming method that scans the images recorded on the document D using the image forming apparatus 100 having the above described structure will be described.

A user put the document D, which will be scanned, on the discharging board 102 in order to scan the document, and inputs a scan command through a predetermined command input device disposed on a computer (not shown) connected to the image forming apparatus 100 or the housing 101. The scan command includes orders about scanning resolution and duplex scanning. Also, in order to scan a part of the surface of the document D, an order about the part may be included in the scan command. Hereinafter, it will be assumed that both surfaces of the document D are scanned in a higher resolution than a default value, that is, a reference value of resolution and the entire part of the surface is scanned.

Figure 3A:
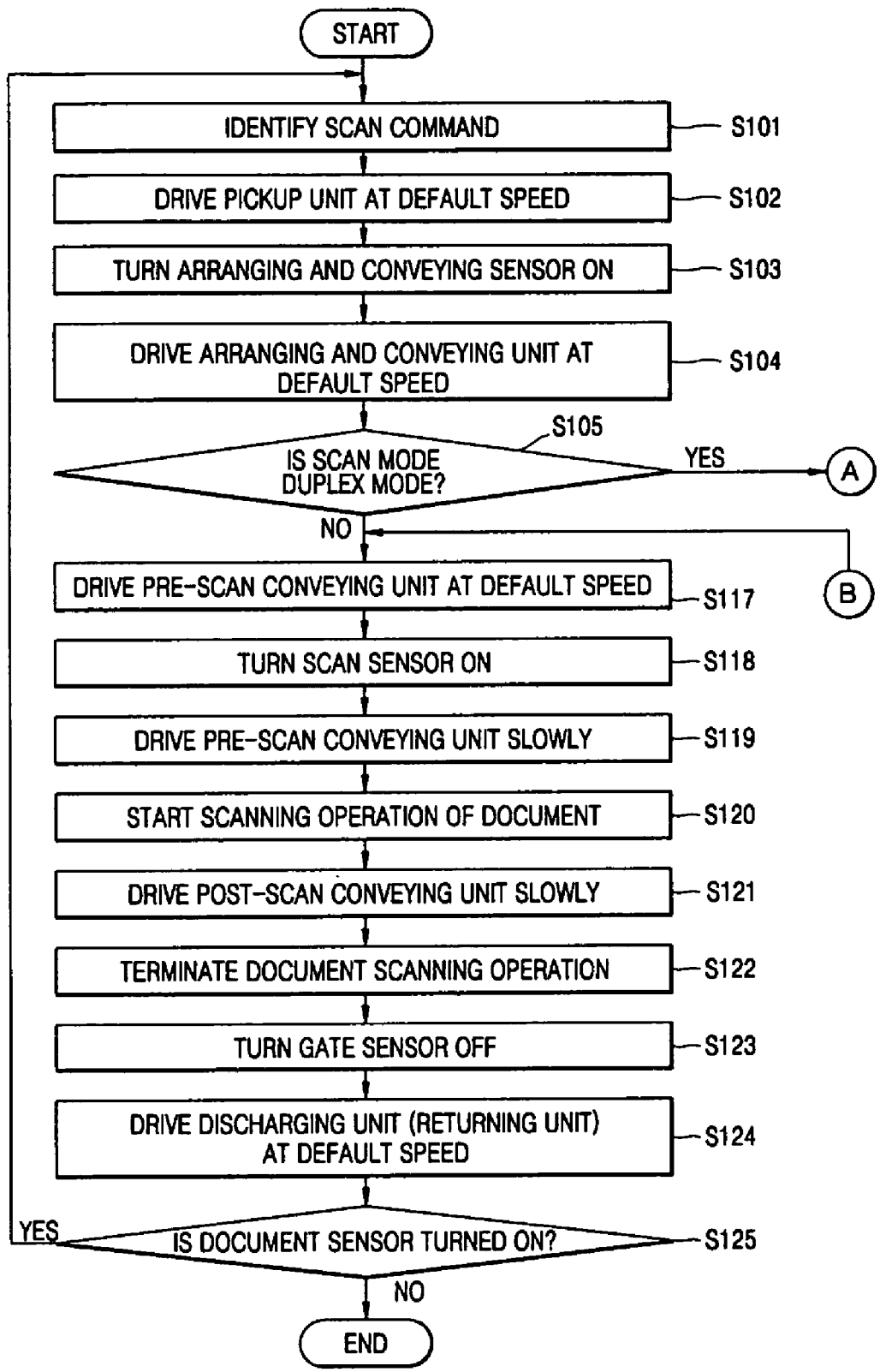
FIGS. 3A, 3B, 4A and 4B are flow charts illustrating methods of forming an image according to a first embodiment and a second embodiment of the present invention, using the image forming apparatus of FIG. 1.
Figure 3B:
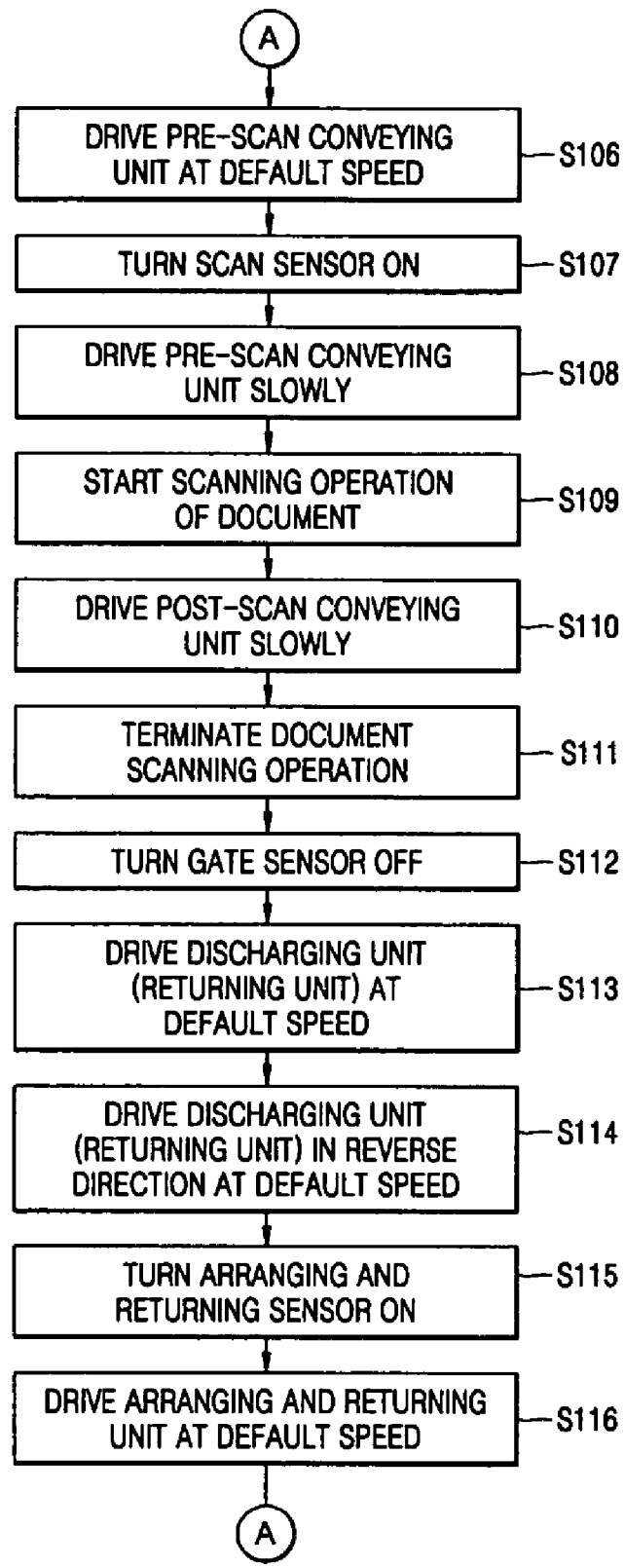

FIG. 3, including FIG. 3A and FIG. 3B, illustrates a first example of an image forming method by an image scanning operation. Referring to FIG. 3, the above scanning command is transmitted to the speed controller through the main controller of the image forming apparatus 100. The speed controller 170 identifies the scanning command (S101), and controls the first motor and the clutch to drive the pickup unit 110 so that the document D is picked up in a default speed and conveyed (S102). The default speed is a velocity of the document D when the document D is scanned in the default resolution. According to the exemplary embodiments of the present invention, the pickup unit 110 is driven at the default speed even though the document is scanned to have high resolution, and thus the reliability of the document pickup operation is improved.

When the document D proceeds, the arranging and conveying sensor 176 is turned on to detect the position of the document D, and the arranging and conveying unit 120 is driven to convey the document D at the default speed after a predetermined time, which is calculated based on the velocity of the document D and the distance between the arranging and conveying sensor 176 and the arranging and conveying unit 120, has lapsed (S104). Also, the pre-scan conveying unit 130 is driven to convey the document D at the default speed after a predetermined time, which is calculated based on the velocity of the document D and the distance between the arranging and conveying sensor 176 and the pre-scan conveying unit 130, has lapsed (S106).

When the document D passes through the pre-scan conveying unit 130, the scan sensor 177 is turned on to detect the position of the document D (S107), and the pre-scan conveying unit 130 is driven to convey the document D at a speed slower than the default speed after a predetermined time, which is calculated based on the velocity of the document D and the distance between the scan sensor 177 and the scan unit 190, has lapsed (S108). During the document D proceeds on the scan unit 190 slowly, the scan unit 190 starts the scanning operation of the lower surface of the document D (S109). When the front edge portion of the document D has passed the scan unit 190, the post-scan conveying unit 140 is driven to convey the document D at a speed slower than the default speed after a predetermined time, which is calculated based on the velocity of the document D and the distance between the scan sensor 177 and the post-scan conveying unit 140, has lapsed (S110). After a predetermined time has lapsed, the scan unit 190 stops performing the scanning operation (S111). On the other hand, the front edge portion of the document D that has passed the post-scan conveying unit 140 turns the gate sensor 178 on, and the discharging unit (returning unit) 160 is driven to convey the document D at a speed slower than the default speed after a predetermined time, which is calculated based on the velocity of the document D and the distance between the gate sensor 178 and the discharging unit 160, has lapsed.

After the scanning operation is completed, if the document D passes the post-scan conveying unit 140 and the gate sensor 178, and the gate sensor 178 is turned off (S112), the discharging unit (the returning unit) 160 is driven to convey the document D at the default speed (S113). The discharging unit (returning unit) 160 conveys the document D in a reverse direction at the default speed after a predetermined time, which is calculated based on the velocity of the document D and the distance between the gate sensor 178 and the discharging unit (returning unit) 160, has lapsed (S114). When the document D proceeds from the post-scan conveying unit 140 toward the discharging unit (returning unit) 160, the shutter 145 is opened. However, after a rear edge portion of the document D passes the shutter 145, the shutter is closed by the weight of itself. Therefore, even if the discharging unit (returning unit) 160 rotates in the reverse direction, the document D cannot proceed toward the post-scan conveying unit 140, but proceeds toward the arranging and conveying unit 150.

When the document D proceeds to the arranging and conveying unit 150, the arranging and returning sensor 179 is turned on (S115), and the arranging and returning unit 150 is driven to convey the document D at the default speed after a predetermined time, which is calculated based on the velocity of the document D and the distance between the arranging and returning sensor 179 and the arranging and returning unit 150, has lapsed (S116). Also, the pre-scan conveying unit 130 is driven again to convey the document D at the default speed after a predetermined time, which is calculated based on the velocity of the document D and the distance between the arranging and returning sensor 179 and the pre-scan conveying unit 130, has lapsed (S117). The document D is turned over while proceeding toward the pre-scan conveying unit 130, thus the upper surface at the previous scanning operation becomes the lower surface.

Then, when the document D passes through the pre-scan conveying unit 130 again, the scan sensor 177 is turned on (S118), and the pre-scan conveying unit 130 is driven to convey the document D at a speed slower than the default speed (S119). In addition, the scan unit 190 starts the scanning operation of the lower surface, that is, the upper surface at the previous scanning operation (S120). After the front edge portion of the document D passes through the scan unit 190, the post-scan conveying unit 140 is driven to convey the document D at a speed slower than the default speed (S121), and the scan unit 190 stops performing the scanning operation after a predetermined time has lapsed (S122). In addition, when the rear edge portion of the document D passes the post-scan conveying unit 140 and the gate sensor 178 to turn the gate sensor 178 off after terminating the scanning operation (S123), the discharging unit (the returning unit) 160 is driven to convey the document D at the default speed (S124). Accordingly, the scanned document D is discharged onto the discharging board 105. When the document sensor 175 is in the turn-on state (S125), the scanning process for a new document D is performed. Steps 117~124 are same as the above described steps 106~113, and detailed descriptions for those are omitted.

In a case where the scanning mode is a simplex scanning mode, not the duplex scanning mode (S105), steps 106~116 are omitted in performing the scanning process. On the other hand, in a case where only a part of the surface of the document D is scanned, the document scanning operation performed by the scan unit 190 is terminated after a predetermined time that is set in accordance with the scanning range of the document D has lapsed, and the post-scan conveying unit 140 is driven to convey the document D at the default speed.

The conveying path of the document D that is in the scanning process can be divided into a pickup section, on which the document is picked and conveyed from the pickup unit 110 to the arranging and conveying unit 120, an arranging and conveying section, on which the document D is arranged and conveyed before scanning the document from the pre-scan conveying unit 177 to the scan unit 190, a scanning and conveying section, on which the document passes on the scan unit 190 and the image on the document is scanned, a post-scan conveying section, on which the scanned document D is conveyed from the scan unit 190 to the discharging and returning unit 160, a discharging section after the discharging unit (returning unit) 160, a returning section, on which the document is returned from the discharging unit (returning unit) 160 to the arranging and conveying unit 150, and an arranging and returning section, on which the document returned from the arranging and conveying unit 140 to the scan unit 190 is arranged and conveyed before being scanned. According to the method shown in FIG. 3, even in a case where the document is scanned with high resolution, the document D is conveyed at the slower speed than the default speed only on the scanning and conveying section, and is conveyed at the default speed at other sections. Thus, the scanning efficiency is improved, that is, the number of documents D that can be scanned per minute increase. If the document D is conveyed faster than the default speed in the other sections, the scanning efficiency is not degraded compared to the case where the document D is scanned in the default resolution.

Figure 4A:
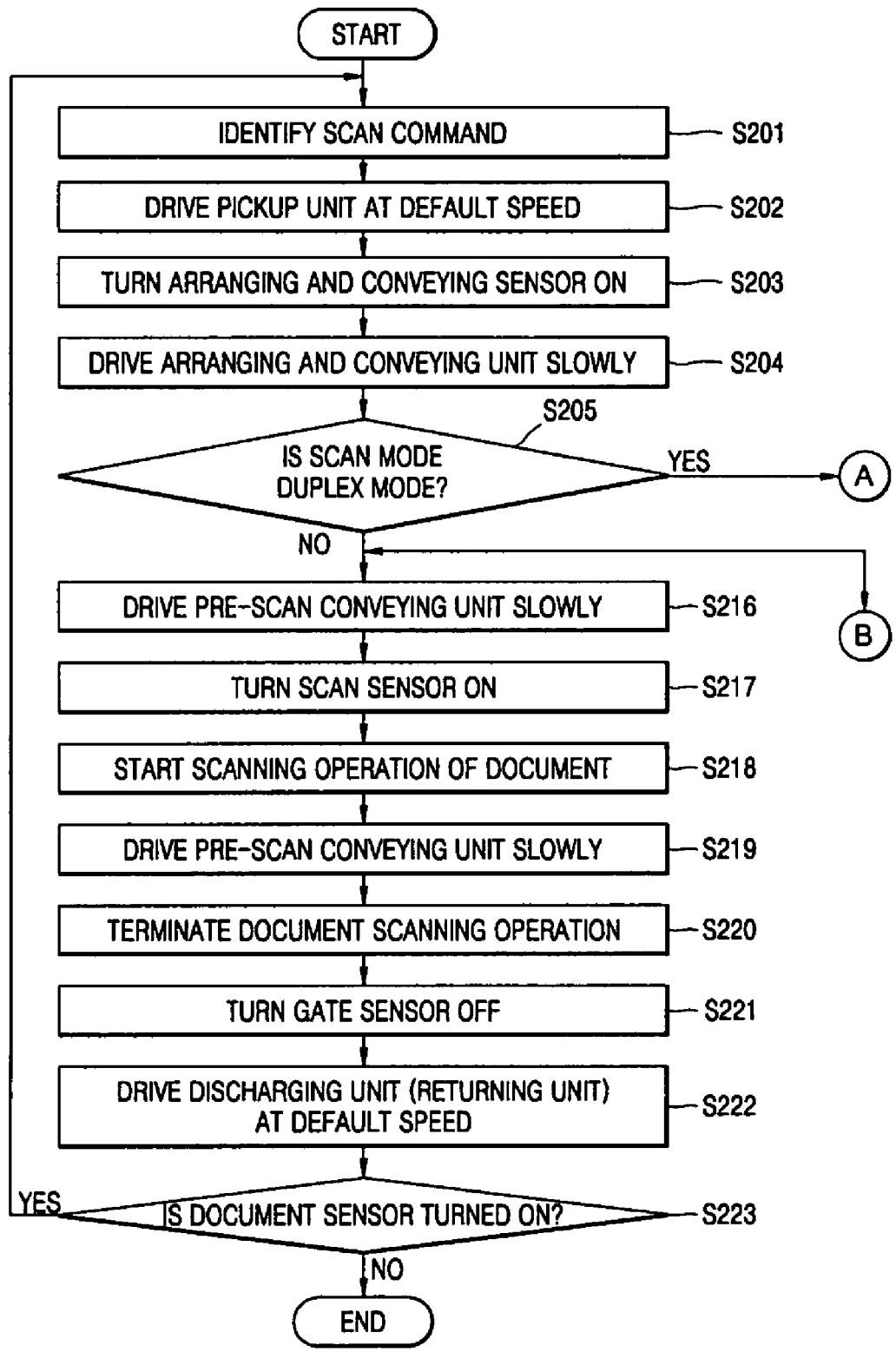
Figure 4B:
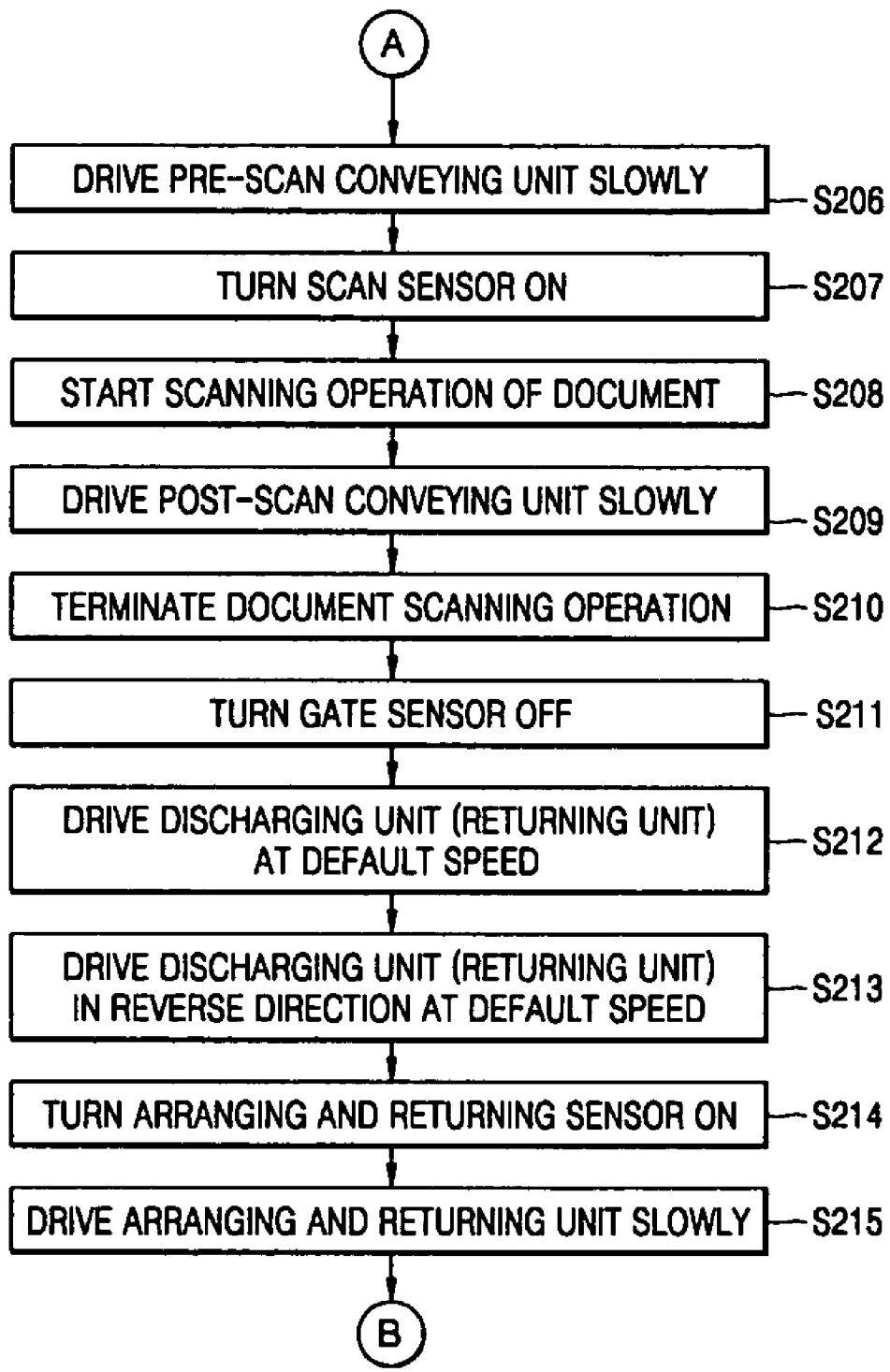

FIG. 4, including FIG. 4A and FIG. 4B, illustrates a second example of the image forming method by scanning the image. Referring to FIG. 4, the speed controller 170 identifies the scan command transmitted through the main controller of the image forming apparatus 100 (S201), and drives the pickup unit 110 so that the document D is picked at the default speed and conveyed (S202). When the document D proceeds, the arranging and conveying sensor 176 is turned on to detect the position of the document D (S203), and the arranging and conveying unit 120 is driven to convey the document D at the slower speed than the default speed after a predetermined time has lapsed (S204). The predetermined time is calculated base on the velocity of the documents D and the distance between the arranging and conveying sensor 176 and the arranging and conveying unit 120. Also, the pre-scan conveying unit 130 is driven to convey the document D at a slower speed after a predetermined time has lapsed (S206). The predetermined time which is calculated based on the velocity of the document D and the distance between the arranging and conveying sensor 176 and the pre-scan conveying unit 130.

When the document D passes the pre-scan conveying unit 130 and proceeds, the scan sensor 177 is turned on to detect the position of the document D (S207), the scan unit 190 starts the scanning operation of the lower surface of the document D that proceeds slowly after a predetermined time has lapsed (S208). The predetermined time is calculated based on the velocity of the document D and the distance between the scan sensor 177 and the scan unit 190. When the front edge portion of the document D passes the scan unit 190, the post-scan conveying unit 140 is driven to slowly convey the document D after a predetermined time has lapsed (S209). The predetermined time is calculated based on the velocity of the document D and the distance between the scan sensor 177 and the post-scan conveying unit 140. The scan unit 190 stops performing the scanning operation after a predetermined time has lapsed (S210). On the other hand, the front edge portion of the document D that passes the post-scan conveying unit 140 during the scanning process turns the gate sensor 178 on, and the discharging unit (returning unit) 160 is driven to slowly convey the document D after a predetermined time has lapsed. The predetermined time is calculated based on the velocity of the document D and the distance between the gate sensor 178 and the discharging unit (returning unit) 160.

After terminating the scanning operation, when the rear edge portion of the document D passes the post-scan conveying unit 140 and the gate sensor 178 to turn the gate sensor 178 off (S211), the discharging unit (returning unit) 160 is driven to convey the document D in the reverse direction at the default speed after a predetermined time has lapsed (S213). The predetermined time is calculated based on the velocity of the document D and the distance between the gate sensor 178 and the discharging unit (returning unit) 160. The document D cannot proceed toward the post-scan conveying unit 140, that is, in the reverse direction due to the shutter 145, but proceeds to the arranging and returning unit 140. Accordingly, the arranging and returning sensor 179 is turned on (S214), the arranging and conveying unit 150 is driven to convey the document D at a speed slower than the default speed after a predetermined time has lapsed (S215). The predetermined time is calculated based on the velocity of the document D and the distance between the arranging and returning sensor 179 and the arranging and returning unit 150. Also, after a predetermined time, which is calculated based on the velocity of the document D and the distance between the arranging and returning sensor 179 and the pre-scan conveying unit 130, has lapsed, the pre-scan conveying unit 130 is driven again to convey the document D slowly (S216). The document D is turned over while proceeding to the pre-scan conveying unit 130, and the upper surface at the previous scanning operation becomes the lower surface.

After that, when the document D passes the pre-scan conveying unit 130 again, the scan sensor 177 is turned on (S217), and the scan unit 190 starts the scanning operation of the lower surface of the document D, which was the upper surface at the previous scanning operation (S218). After the front edge portion of the document D passes the scan unit 190, the post-scan conveying unit 140 is driven to slowly convey the document D (S219), and after a predetermined time has passed, the scan unit 190 terminates the scanning operation (S220). In addition, after terminating the scanning operation, when the rear edge portion of the document D passes the post-scan conveying unit 140 and the gate sensor 178 to turn the gate sensor 178 off (S221), the discharging unit (returning unit) 160 is driven to convey the document D at the default speed (S222). Accordingly, the scanned document D is discharged onto the discharging board 105, and if the document sensor 175 is in the turn-on status (S223), the scanning operation for the new document is started. Operations S216~S222 are the same as the above described operations S206~S212, and detailed descriptions for these are omitted. In addition, if it is determined that the scanning mode is the simplex scanning mode and not the duplex scanning mode (S205), operations of S206~S215 are omitted and the scanning operation is performed.

According to the method illustrated in FIG. 4, in a case where the document D is scanned with high resolution, the document D is conveyed slower than the default speed on the arranging and conveying section, the arranging and returning section, and the scanning and conveying section, and is conveyed at the default speed on the other sections. Accordingly, the scanning efficiency can be increased compared to the conventional art.

According to the apparatus and method of forming the image of the present invention, even when the high resolution scanning operation is performed, sections where the document D proceeds slowly, are reduced, thereby improving the scanning efficiency.

Also, the pickup operation of the document in a high resolution scanning operation is performed at the same speed as that of the low resolution scanning operation, so that a pickup error that may be generated due to the slow rotation of the pickup roller can be prevented.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An image forming method for an image forming apparatus, comprising a conveying unit conveying a document, by which digital image information is generated by conveying a document and scanning an image recorded on the document while conveying the document, the method comprising:
conveying a document with the conveying unit at a default speed at an initial stage of a conveying operation, and conveying the document with the conveying unit at a speed slower than the default speed while performing an image scanning operation of the image recorded on the document in a high resolution scanning operation, which has a greater resolution than a default resolution.

2. The method of claim 1, wherein the document is conveyed while passing through a pickup section, where the document is picked by a pickup unit and started to be conveyed, a scanning and conveying section where an image on a surface of the document is scanned during conveying the document with the conveying unit, and a discharging section where the scanned document is discharged by a discharging unit and conveying of the document is terminated, and wherein the document is conveyed slower than the default speed by the conveying unit in the scanning and conveying section.

3. The method of claim 2, wherein the document is conveyed while passing through an arranging and conveying section in which the picked document is arranged before being scanned, and the document is conveyed slower than the default speed by the conveying unit while passing through the arranging and conveying section.

4. The method of claim 2, wherein the document is conveyed while passing through a post-scan conveying section which conveys the scanned document, and the document is conveyed at a speed slower than the default speed by the conveying unit while being conveyed in the post-scan conveying section.

5. The method of claim 2, wherein the document passes through a returning section in which the document is returned in order to scan an image recorded on the other surface of the document, wherein the document is conveyed by a returning unit again in the scanning and conveying section in order that the image recorded on the other surface of the document can be scanned, and wherein the document is conveyed at a speed slower than the default speed by the conveying unit while passing through the scanning and conveying section again.

6. The method of claim 5, wherein the document is conveyed by the returning unit in an arranging and returning section, on which the returned document is arranged before being scanned, and wherein the document is conveyed at a speed slower than the default speed by the conveying unit while passing through the arranging and returning section.

7. An image forming apparatus, which generates digital image information by conveying a document and scanning an image recorded on the document during the conveying of the document, the apparatus comprising:
a scan unit scanning the image recorded on the document; and
a conveying unit conveying the document at a default speed during an initial stage of conveying the document, and conveying the document at a speed slower than the default speed while scanning the image of the image recorded on the document in a high resolution scanning operation that has a higher resolution than a default resolution.

8. The apparatus of claim 7, wherein the conveying unit includes:
a pickup unit starting the conveying process of the document by picking up the document;
a pre-scan conveying unit conveying the document toward the scan unit so that an image on a surface of the document can be scanned;
a discharging unit discharging the scanned document and terminating the conveying process; and
a speed controller, coupled to the pickup unit, the pre-scan conveying unit, and the discharging unit, controlling the pickup unit at the initial stage of the conveying process so that the document can be conveyed at a default speed, and controlling the pre-scan conveying unit during the image scanning operation so that the document can be conveyed at a speed slower than the default speed.

9. The apparatus of claim 8, wherein:
the conveying unit includes an arranging and conveying unit that arranges the picked document before scanning the document; and
the speed controller includes an element that controls the arranging and conveying unit so that the document passing through the arranging and conveying unit can be conveyed at a speed slower than the default speed.

10. The apparatus of claim 8, wherein:
the conveying unit comprises a post-scan conveying unit, coupled to the speed controller, that conveys the scanned document; and
the speed controller comprises an element that controls the post-scan conveying unit so that the document passing through the post-scan conveying unit can be conveyed at a speed slower than the default speed during the image scanning operation.

11. The apparatus of claim 8, wherein:
the conveying unit includes a returning unit that returns the document to the pre-scan conveying unit in order to scan an image recorded on another surface of the document, one surface of which is scanned previously; and
the speed controller includes an element that controls the pre-scan conveying unit so that the document can be conveyed at a speed slower than the default speed while the image on the other surface of the document is scanned.

12. The apparatus of claim 11, wherein:
the conveying unit includes an arranging and returning unit that arranges the document before the returned document is scanned; and
the speed controller comprises an element that controls the arranging and returning unit so that the document passing through the arranging and returning unit can be conveyed at a speed slower than the default speed.

13. An image forming method for an image forming apparatus comprising a conveying unit conveying a document, by which digital image information is generated by conveying a document and scanning an image recorded on the document while conveying the document, the method comprising:
conveying a document with the conveying unit at a first speed at an initial stage of a conveying operation, and conveying the document with the conveying unit at a second speed while performing an image scanning operation,
wherein the second speed is varied in accordance with a scanning resolution for the document to be scanned.

14. The method of claim 13, wherein the first speed and the second speed are not the same speed when the scanning resolution is not a default resolution.

15. The method of claim 13, wherein the first speed is higher than the second speed if the scanning resolution is higher than a default resolution.

16. The method of claim 13, wherein the first speed is lower than the second speed if the scanning resolution is lower than a default resolution.

17. An image forming apparatus, which generates digital image information by conveying a document and scanning an image recorded on the document during conveying the document, the apparatus comprising:
a scan unit scanning the image recorded on the document; and
a conveying unit, coupled to the scan unit, conveying the document at a first speed in an initial stage of conveying the document, and conveying the document at a second speed while scanning the image in a scanning operation,
wherein the second speed is varied in accordance with a scanning resolution for the document to be scanned.

18. The apparatus of claim 17, wherein the first speed and the second speed are not the same speed when the scanning resolution is not a default resolution.

19. The apparatus of claim 18, wherein the first speed is higher than the second speed if the scanning resolution is higher than a default resolution.

20. The apparatus of claim 18, wherein the first speed is lower than the second speed if the scanning resolution is lower than a default resolution.

* * * * *

UNITED STATES PATENT AND TRADEMARK OFFICE
CERTIFICATE OF CORRECTION

PATENT NO. : 7,746,523 B2  Page 1 of 1
APPLICATION NO. : 11/080392
DATED : June 29, 2010
INVENTOR(S) : Yun-su Kim It is certified that error appears in the above-identified patent and that said Letters Patent is hereby corrected as shown below:

Column 1, Line 8 Delete "2004-17633," and insert -- 2004-17663, --, therefor

Signed and Sealed this

Sixteenth Day of November, 2010

David J. Kappos
*Director of the United States Patent and Trademark Office*